United States Patent
Gerber et al.

(10) Patent No.: US 12,297,878 B2
(45) Date of Patent: May 13, 2025

(54) APPARATUS FOR DRUM BRAKE ASSEMBLY

(71) Applicants: ZF Active Safety US Inc., Livonia, MI (US); ZF Active Safety GmbH, Koblenz (DE)

(72) Inventors: Kraig Gerber, Plymouth Township, MI (US); Mauro Marconcin, South Lyon, MI (US); Paul Wecker, Limburg (DE)

(73) Assignees: ZF ACTIVE SAFETY US INC., Livonia, MI (US); ZF ACTIVE SAFETY GMBH, Koblenz (DE)

( * ) Notice: Subject to any disclaimer, the term of this patent is extended or adjusted under 35 U.S.C. 154(b) by 71 days.

(21) Appl. No.: 17/728,202

(22) Filed: Apr. 25, 2022

(65) Prior Publication Data

US 2023/0341018 A1    Oct. 26, 2023

(51) Int. Cl.
*F16D 65/09*    (2006.01)
*F16D 65/10*    (2006.01)

(52) U.S. Cl.
CPC ............. *F16D 65/09* (2013.01); *F16D 65/10* (2013.01)

(58) Field of Classification Search
CPC ................................. F16D 65/09; F16D 65/10
See application file for complete search history.

(56) References Cited

U.S. PATENT DOCUMENTS

| 6,681,902 | B1 | 1/2004 | Siekas et al. |
| 8,011,482 | B2 | 9/2011 | Boyle et al. |
| 2003/0168297 | A1 * | 9/2003 | Ikeda ................... F16D 65/563 |
| | | | 188/328 |

FOREIGN PATENT DOCUMENTS

| DE | 102008013747 A1 * | 9/2008 | ............. F16D 51/48 |
| EP | 0992701 A2 * | 4/2000 | |
| GB | 1287941 A * | 9/1972 | |
| GB | 1288265 A | 9/1972 | |
| GB | 1476961 A * | 6/1977 | ............. F16D 51/24 |
| JP | 2001193764 A * | 7/2001 | ............. F16D 51/24 |
| KR | 2000034027 A * | 6/2000 | ............. F16D 51/20 |
| KR | 20190130737 A * | 11/2019 | |
| WO | WO-2004007985 A1 * | 1/2004 | ............. F16D 51/20 |
| WO | 2019/133600 A1 | 7/2019 | |

OTHER PUBLICATIONS

German Search Report dated Apr. 16, 2024, referencing Application No. 10 2023 203 676.2, 10 pages.

* cited by examiner

*Primary Examiner* — Melody M Burch
(74) *Attorney, Agent, or Firm* — Tarolli, Sundheim, Covell & Tummino LLP

(57) ABSTRACT

An apparatus for a drum brake assembly having a brake drum includes a brake shoe and a pivot lever connected to the brake shoe. The pivot lever has a first condition movable with the brake shoe to apply braking force to the brake drum and a second condition deflected relative to the brake shoe for absorbing brake drum contraction forces.

7 Claims, 8 Drawing Sheets

APPARATUS FOR DRUM BRAKE ASSEMBLY

TECHNICAL FIELD

The present invention relates generally to braking systems, and specifically to a deflectable pivot lever for a drum brake assembly.

BACKGROUND

Drum-in-hat brakes are provided on the rear wheels of vehicles in order to a apply a parking brake to the vehicle wheels. The drum-in hat brakes include brake shoes selectively movable away from one another and into engagement with the brake drum to apply braking force to the brake drum via friction pads. The brake shoes are locked in this position to apply and hold the parking brake until released by the vehicle operator.

SUMMARY

In one aspect of the invention, an apparatus for a drum brake assembly having a brake drum includes a brake shoe and a pivot lever connected to the brake shoe. The pivot lever has a first condition movable with the brake shoe to apply braking force to the brake drum and a second condition deflected relative to the brake shoe for absorbing brake drum contraction forces.

In another aspect of the invention, an apparatus for a drum brake assembly having a brake drum and a wheel cylinder includes a brake shoe. First and second pivot levers connected to respective first and second sides of the brake shoe. Each of the first and second pivot levers has a first end and a second end. A lever tip is non-rotatably connected to the first ends of the first and second pivot levers and configured to be engaged by the wheel cylinder for moving the first ends of the first and second pivot levers. A fastener is connected to the brake shoe for engaging and pre-stressing the second ends of the first and second pivot levers. The first and second pivot levers have a first condition movable with the brake shoe to apply braking force to the brake drum and a second condition deflected and displaced at the first ends of the first and second pivot levers relative to the brake shoe for absorbing brake drum contraction forces.

Other objects and advantages and a fuller understanding of the invention will be had from the following detailed description and the accompanying drawings.

DETAILED DESCRIPTION

Figure 1:
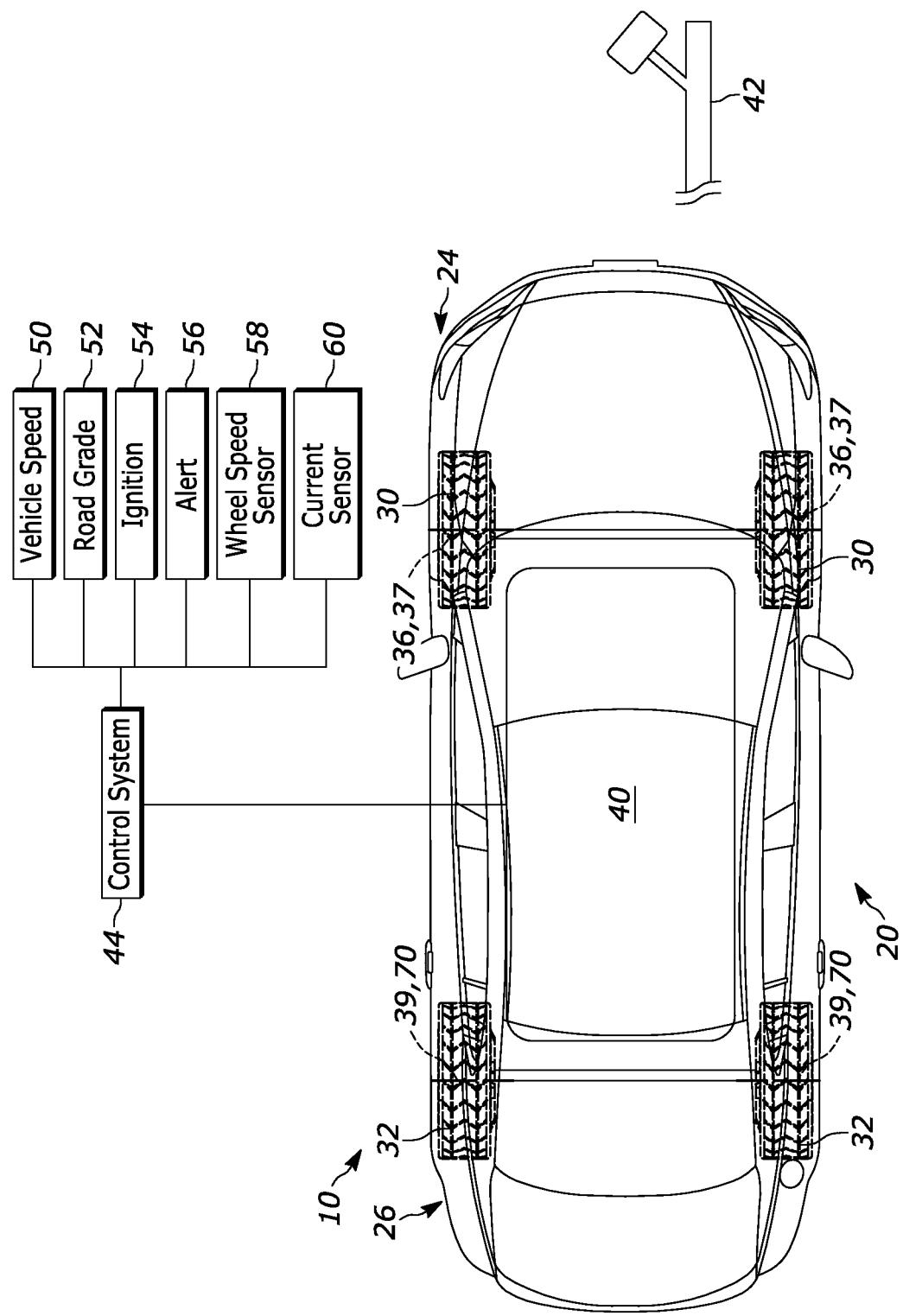
FIG. 1 is a schematic illustration of a vehicle having a drum brake assembly in accordance with an aspect of the present invention.

The present invention relates generally to braking systems, and specifically to a deflectable pivot lever for a drum brake assembly. FIG. 1 illustrates an example electric brake/braking system 10 for a motor vehicle 20 in accordance with the present invention.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). Disc brakes 37 are associated with each wheel rotor 36. A brake pedal 42 can be used to actuate the disc brakes 37 to apply service braking to the wheels 30.

A pair of steerable or non-steerable wheels 32 is provided at the rear end 26. Each rear wheel 32 includes a wheel rotor 70 driven by a steering linkage (not shown). Drum brake assemblies 39, e.g., drum-in-hat brake assemblies, are associated with each wheel rotor 70. A propulsion system 40, e.g., an engine and/or battery, supplies torque to the wheels 30.

A control system 44 is provided to help control operation of the vehicle 20, such as operation of the propulsion system 40 and vehicle braking, including operation of the drum brakes assemblies 39. To this end, the control system 44 can include one or more controllers, such as a propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of ignition status. A wheel speed sensor 58 is provided on/adjacent to each wheel 32 and generates signals indicative of the speed at each wheel. The control system 44 also receives signals indicative of the degree-including velocity and acceleration—the brake pedal 42 is depressed.

The control system 44 can receive and interpret these signals and perform vehicle functions, e.g., braking, in response thereto. In one example, the control system 44 can detect wheel slip between one or more wheels 30, 32 and the driving surface based on the sensors 50, 58 and perform anti-lock braking (ABS) and/or electronic stability control (ESC) using one or more disc brakes 37. The control system 44 can also be connected to an alert 56 for notifying the driver/operator of the vehicle 20 of vehicle conditions, vehicle status, braking operations, and/or environmental conditions.

Figure 2:
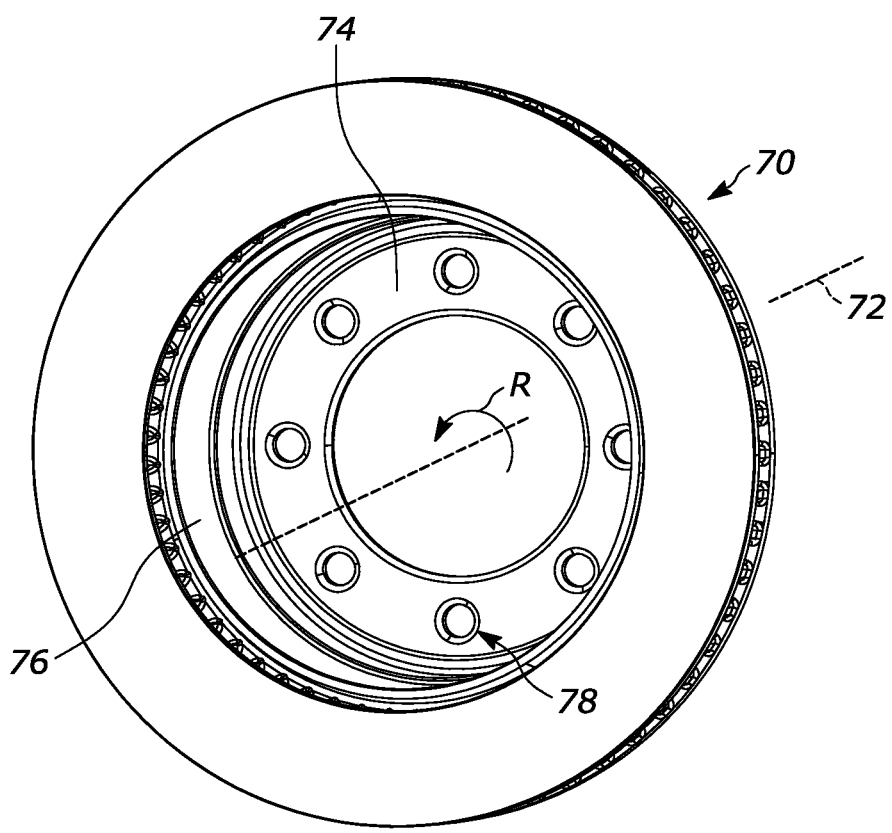
FIG. 2 is a schematic illustration of a drum-in-hat brake rotor of the drum brake assembly.

Referring to FIG. 2, the rotor 70 associated with each rear wheel 32 can be a drum-in-hat rotor centered on an axis 72. To this end, the rotor 70 includes a hat or brake drum 74 having an inner surface 76 configured as a braking surface for interacting with the drum brake assembly 39. Mounting holes 78 in the rotor 70 allow the drum brake assembly 39 to be secured thereto. The direction of rotation of the rotor 70 during normal driving of the vehicle 20 is indicated at R.

Figure 3:
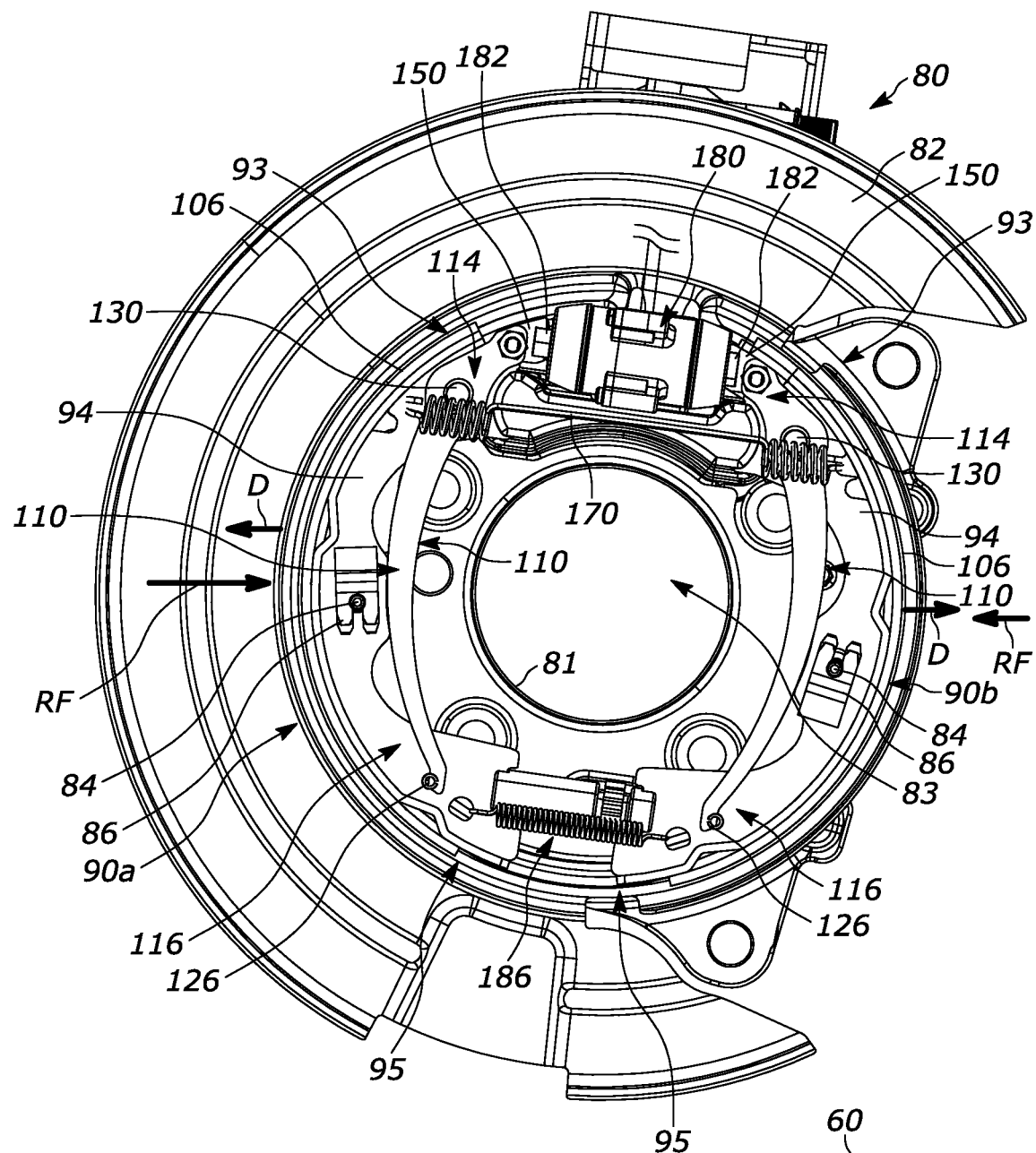
FIG. 3 is schematic illustration of an adapter, splash shield, and brake shoes of the drum brake assembly to which pivot levers are connected.
Figure 3:
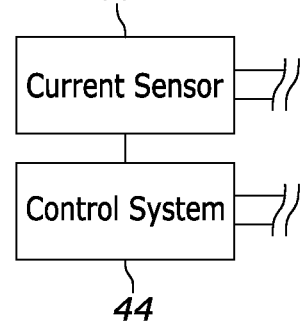

The drum brake assembly 39 includes an adapter assembly 80 (FIG. 3) secured to the brake drum 74. The adapter assembly 80 includes a central adapter 81 having a central opening 83. A splash shield 82 covers the adapter 81 and extends radially outward therefrom. A pair of brake shoes 90a, 90b is mounted to the splash shield 82 on opposite sides of the opening 83. In particular, a hold down pin 84 extends from the splash shield 82 and through each brake shoe 90a, 90b. A spring 86 is secured to each pin 84 to keep the brake shoes 90a, 90b substantially in the same plane as one another. The constructions of the brake shoes 90a, 90b is identical and, thus, the description of only the brake shoe 90a is provided for brevity.

Figure 4A:
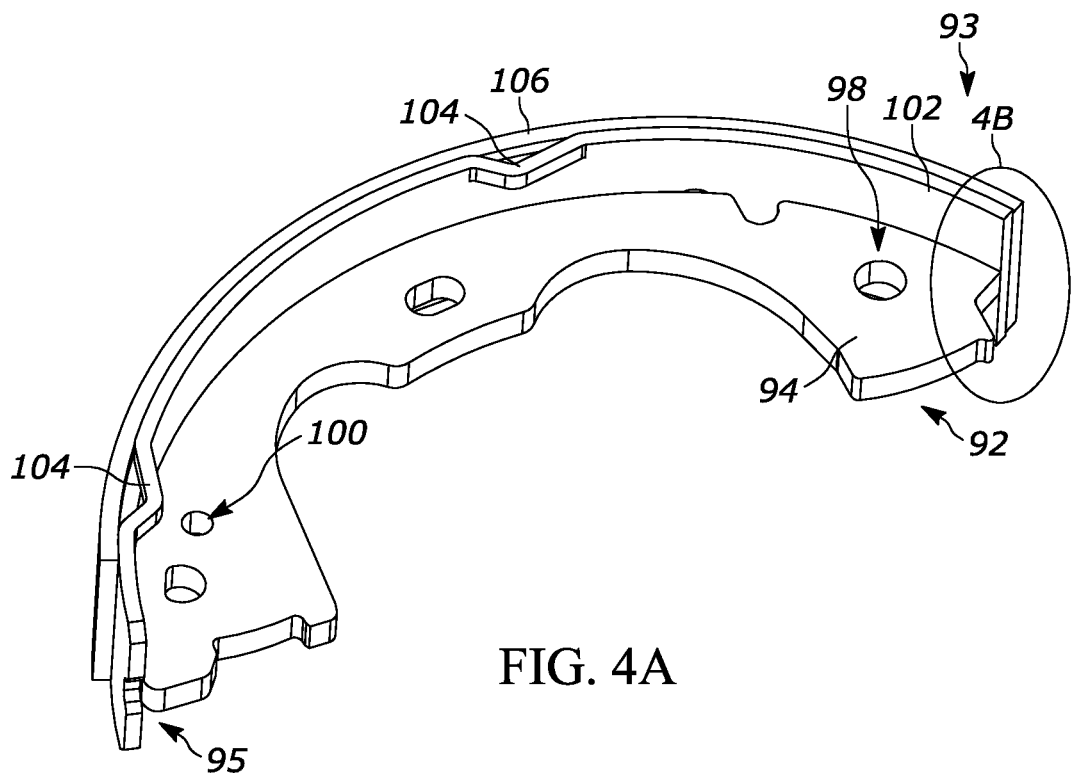
FIG. 4A is a front view of the brake shoe without the pivot levers attached.

The brake shoe 90a is generally curved or arcuate and extends circumferentially about the opening 83 in the splash shield 82. Turning to FIG. 4A, the brake shoe 90a includes a base 92 extending from a first end 93 to a second end 95. The base 92 includes a web portion 94 and a rim portion 102 extending perpendicular to the web portion. The web portion 94 is generally flat and crescent-shaped. The web portion 94 bisects the rim portion 102.

Figure 4B:
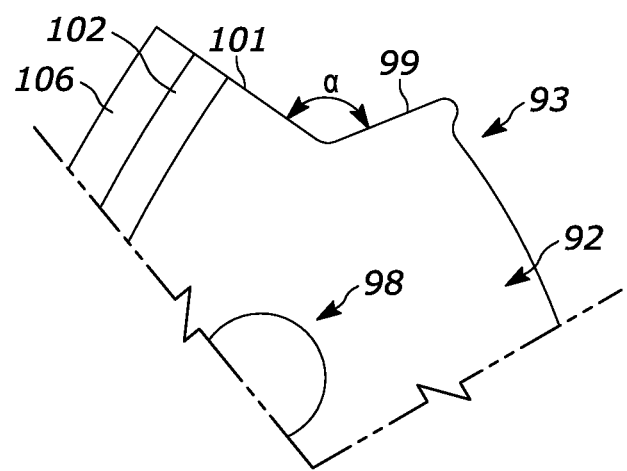
FIG. 4B is an enlarged view of a portion of the brake shoe of FIG. 4A.

An opening 98 extends through the web portion 94 at the first end 93 of the base 92. An opening 100 extends through the web portion 94 at the second end 95 of the base 92. A notch defines a pair of end surfaces 99, 101 (see FIG. 4B) on the web portion 94 at the first end 93. The end surfaces 99, 101 extend at an angle α relative to one another. In one example, the angle α is greater than 90°.

The rim portion 102 is arcuate and rigidly secured to the web portion 94, such as by welding. One or more shoe slides 104 are provided on the rim portion 102 and extend inwards generally towards the web portion 94. More specifically, the shoe slides 104 are formed as indentations arranged circumferentially along the rim portion 102. A friction pad 106 is secured to the outer arcuate surface of the rim portion 102. The friction pad 106 has the same shape and general contour as the inner surface 76 of the brake drum 74.

One or more pivot levers 110 are rotatably connected to each brake shoe 90a, 90b. As shown, pivot levers 110 are provided on opposing sides of the web portion 94 of each brake shoe 90a, 90b. Alternatively, a single pivot lever 110 can be connected to each brake shoe 90a, 90b (not shown). Each pivot lever 110 can be formed as a single component (not shown) or from multiple, substantially identical components stacked atop one another (as shown).

In one example, the pivot lever 110 includes a first member and a second member stacked and aligned with one another. In such a construction, the members are rigidly secured to one another such that the pivot lever 110 acts as a single, unitary component. It will be appreciated that if the pivot lever 110 is formed from multiple layers those layers can be formed from the same material or different materials. This enables the stiffness of the pivot lever 110 to be specifically tailored to meet the desired application. The pivot lever 110 (or members thereof) can be formed from one or more durable, resilient materials such as steel, e.g., stainless steel.

Figure 5:
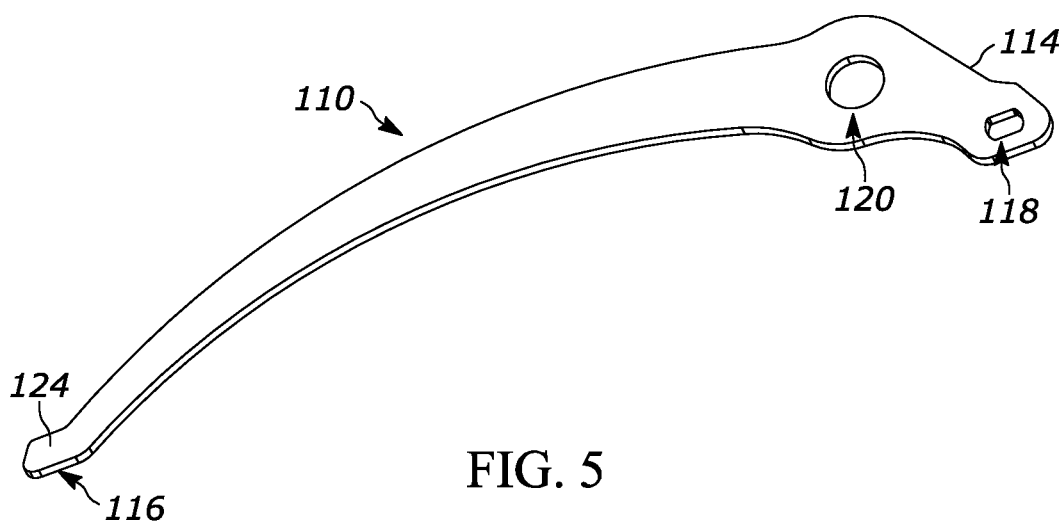
FIG. 5 is a front view of a pivot lever for the brake shoe.

Referring to FIG. 5, the pivot lever 110 extends longitudinally from a first end 114 to a second end 116. The pivot lever 110 has a generally curved or arcuate shape. An opening 118 having a non-circular shape, e.g., oblong, extends through the first end 114. A circular opening 120 is positioned between the opening 118 and the second end 116. An angled projection 124 extends from the second end 116.

When the pivot levers 110 are positioned on opposite sides of the web portion 94 (FIG. 6A), the openings 120 in the pivot levers are aligned with the opening 98 in the web portion. An axle 130 extends through the aligned openings 98, 120 to rotatable connect the pivot levers 110 to the web portion 94. Retaining clips 132 can be secured to the axle 130 on either side of the pivot levers 110 to axially retain the pivot levers on the axle. It will be appreciated that alternative or additional fasteners can be used to rotatably connect the pivot levers 110 to the web portion 94.

A retaining pin 136 extends through the opening 100 in the web portion 94. The retaining pin 136 can be cylindrical. The opening 100 and retaining pin 136 are positioned to enable the projections 124 of the pivot levers 110 to be moved from an unstressed position (shown in solid in FIG. 6B) to a stressed or loaded position (shown in phantom in FIG. 6B).

Figure 6A:
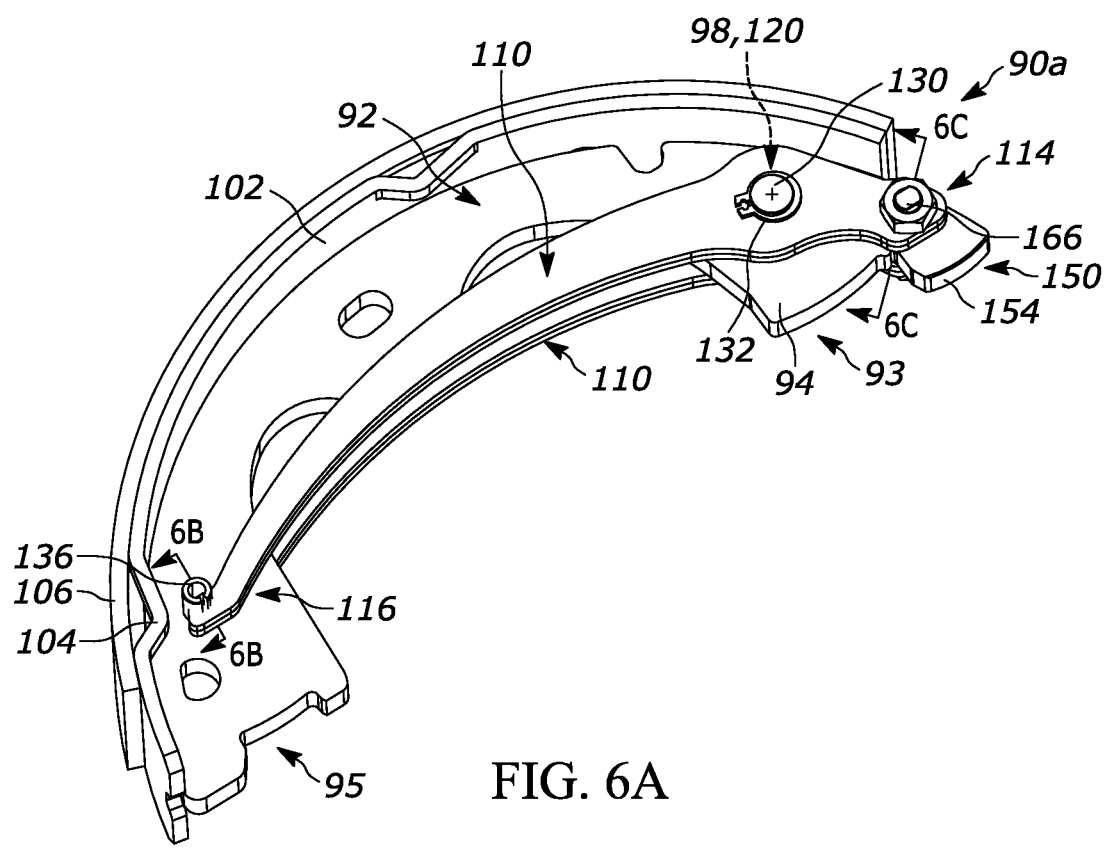
FIG. 6A is front view of the pivot levers connected to the brake shoe.
Figure 6B:
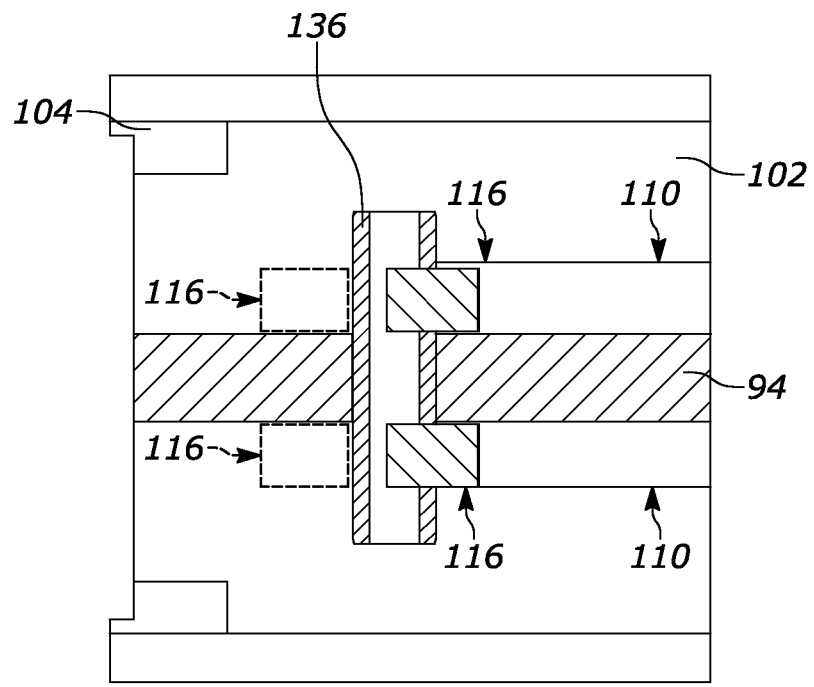
FIG. 6B is an enlarged view of a portion of FIG. 6A illustrating the pivot levers pre-loaded onto the brake shoe.
Figure 6C:
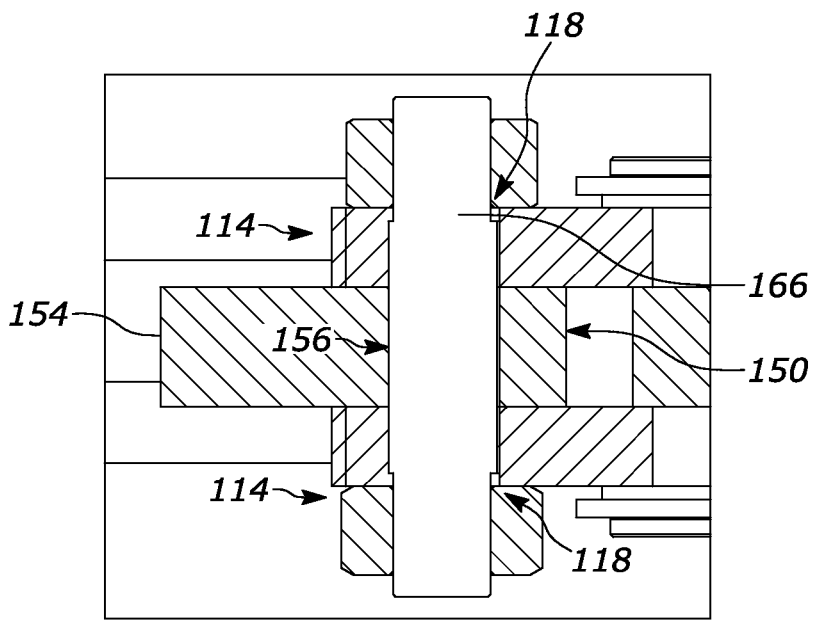
FIG. 6C is a section view taken along line 6C-6C of FIG. 6A.

A lever tip 150 is positioned between and secured to the first ends 114 of the pivot levers 110 on each respective brake shoe 90a, 90b. Referring to FIGS. 6A and 6C, the lever tip 150 includes a first, rounded portion 152 and a second portion 154. A non-circular opening 156 extends through the lever tip 150. As shown, the opening 156 is oblong but other shapes are contemplated. In any case, the opening 156 has the same shape as the opening 118 in each pivot lever 110.

That said, the opening 156 is positioned between and aligned with the openings 118 in the pair of pivot levers 110. A fastener 166 extends through the aligned openings 118, 156 and is configured to prevent relative rotational and axial movement between the lever tip 150 and the first end 114 of either pivot lever 110 secured thereto. For instance, the fastener 166 can include an oblong shaft extending through the aligned openings 118, 156 and nuts threaded to opposing ends of the shaft to rigidly fix the lever tip 150 to the first ends 114. Other fastening configurations are contemplated. In any case, the pivot levers 110 and lever tip 150 are secured to one another such that the first portion 152 of the lever tip 150 has a first or initial condition abutting the surface 99 of the web portion 94 but spaced from the surface 101.

It will be appreciated that due to the connections between the web portion 94, pivot levers 110, and lever tip 150, the first ends 114 of the pivot lever 110 are pivotable about the axle 130 relative to the web portion. The lever tip 150 non-rotatably secured to the first ends 114 is therefore likewise pivotable about the axle 130 relative to the web portion 94. The second ends 116 of the pivot levers 110, however, are pinned/fixed in place against the retaining pin 136, and the first portion 152 abuts the surface 99. Consequently, any pivoting of the first ends 114 and lever tip 150 about the axle 130 and away from the surface 99 would require deflection of the first ends. In this manner, the pivot levers 100 are configured as pinned spring beams.

Turning back to FIG. 3, tension springs 170 are secured to and extend between the brake shoes 90a, 90b. In particular, one tension spring 170 (shown) is secured to the sides of the brake shoes 90a, 90b facing away from the splash shield 82. Another tension spring (not shown) is secured to the opposing sides of the brake shoes 90a, 90b facing towards the splash shield 82. A linear actuator 180 is secured to the splash shield 82 and positioned between the first ends of the 93 of the brake shoes 90a, 90b. In one example, the actuator is a wheel cylinder 180 having hydraulically actuated, opposing pistons 182. Each piston 182 is coupled to the first end 93 of one of the brake shoes 90a, 90b and responsible for displacing the first end.

To this end, in the example shown the end of each piston 182 can be configured to receive the second portion 154 of the lever tip 150 fixed to the first end 114 of the pivot lever 110. Alternatively, the lever tip 150 can be omitted entirely and the end of the piston 182 instead be secured between the two first ends 114 of the pivot levers 110 on each respective brake shoe 90a, 90b (not shown).

Any number of mating connection or interface, e.g., a clevis-type interface, can be used to couple the piston 182 to the respective brake shoe 90a, 90b. To this end, any of the piston 182, lever tip 150 or first end(s) 114 of the pivot lever(s) 110 can be U-shaped, T-shaped, tongue-in-groove, etc. The connection can occur either directly with the first ends 114 or indirectly with the first ends via the lever tip 150 so long as the pistons 182 are capable of causing the pivot levers 110 to move and thereby causing the brake shoes 90a, 90b associated therewith to move.

An adjusting mechanism 186 is provided between and secured to the second ends 95 of the brake shoes 90a, 90b. The adjusting mechanism 186 is lengthened in a known manner, e.g., automatically or manually, as the friction pads 106 wear down to maintain a substantially constant radial spacing between the brake shoes 90a, 90b and the inner surface 76 prior to actuating the brakes. Consequently, the travel length of the pistons 182 for each brake application is substantially maintained as the friction pads 106 go through their service life.

When the drum brake assembly 39 is assembled, the ends 93, 95 of the brake shoes 90a, 90b are held by a slotted abutment of the adapter 81 (beneath the tension spring 170 shown) and the adjusting mechanism 186, respectively, such that the brake shoes are suspended within the brake drum 74. The tension springs 170 help bias the ends 93 towards the abutment. The hold down pins 84 and associated springs 86 help keep the brake shoes 90a, 90b in the same plane. The second ends 116 of the pivot levers 110 are pinned against the retaining pins 136 to pre-stress or pre-load the pivot levers. This pre-loading also ensures the pivot levers 110 are pivoted about the axle 130 to a position in which the first portion 152 of the lever tip 150 abuts the surface 99.

The brake shoes 90a, 90b are selectively operable between braking and non-braking positions. In the braking position, the brake shoes 90a, 90b contact and press against the inner surface 76 of the brake drum 74 to slow or otherwise stop rotation of the rear wheel 32 (FIG. 1) to which the brake drum is rotationally fixed. In the non-braking position, the brake shoes 90a, 90b do not contact the inner surface 76 of the brake drum 74 and thereby allow the rear wheel 32 to rotate freely.

During operation of the vehicle 20, the driver can apply the parking brake, e.g., either mechanically with a lever or electronically by pushing a button. The control system 44 can receive signals from one or more of the sensors, e.g., the brake pedal 42, vehicle speed sensor 50, road grade sensor 52 and/or wheel speed sensor 58, and determine that actuating the parking brake is appropriate. In response, the control system 44 actuates the wheel cylinder 180 associated with each rear wheel 32. The pistons 182 in each wheel cylinder 180 are moved outward away from each other, thereby pushing the lever tips 150 secured thereto away from one another.

The brake shoes 90a, 90b are initially spaced from the inner surface 76 and, thus, there is little to no initial resistance to outward movement of the brake shoes towards the inner surface 76. Consequently, each brake shoe 90a, 90b pivots outward about its respective end 95 in the manner indicated generally at D until the friction pad 106 engages the inner surface 76 of the brake drum 74 to apply braking force thereto. The pivot levers 110 during this phase are in a first or initial condition moving with the respective brake shoe 90a, 90b. In other words, no relative movement occurs between any portion of the pivot levers 110 and the respective brake shoe 90a. 90b coupled thereto.

The wheel cylinder 180 is actuated until the current draw on the wheel cylinder 180 reaches a predetermined value, at which point the wheel cylinder is turned off. The current draw can be measured and monitored by a current sensor 60 (see also FIG. 1) connected to the wheel cylinder 180 and the control system 44. Turning the wheel cylinder 180 off locks the pistons 182 in position and therefore locks the brake shoes 90a, 90b in the braking condition applying the parking brake force to the inner surface 76. The brake drum 74, in turn, exerts reaction forces (indicated generally at RF) on the brake shoes 90a, 90b. The reaction forces RF are transferred from the friction pads 106, through the pivot levers 110, to the lever tip 150, and ultimately to the pistons 182. Consequently, the locked pistons 182 oppose the reaction forces RF applied by the brake drum 74 to the brake shoes 90a, 90b.

It will be appreciated that depending on the driving and/or braking conditions, the brake drum 74 can undergo thermal expansion during application of the parking brake. As a result, the travel distance of the pistons 182 increases to accommodate the extra clearance needed to reach the inner surface 76. That said, once the parking brake is applied and the vehicle 20 exited, the brake drum 74 naturally begins to cool. More specifically, the inner surface 76 of the brake drum 74 contracts towards the brake shoes 90a, 90b and wheel cylinder 180. This can undesirably increase reaction forces RF borne by the locked pistons 182.

Figure 7A:
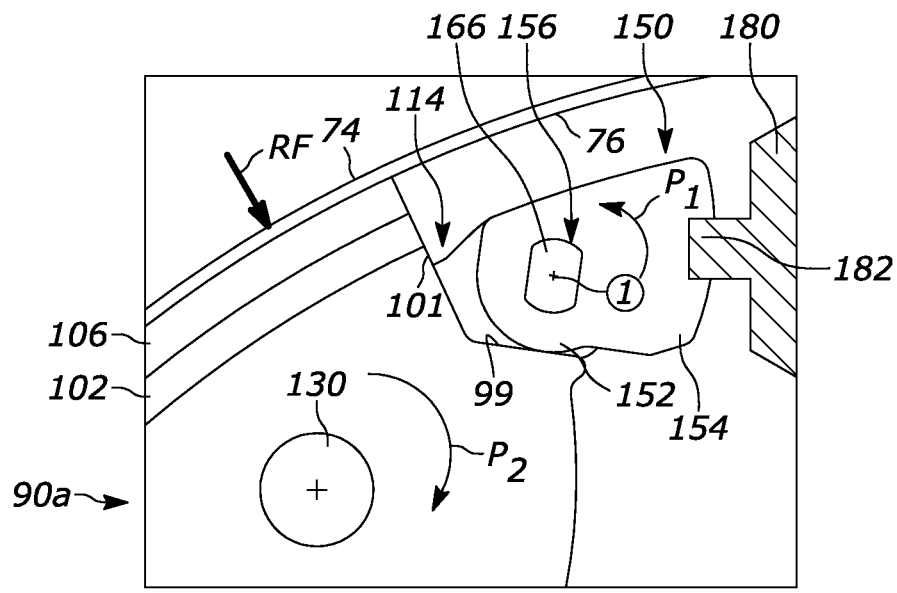
FIG. 7A is a schematic illustration of the pivot levers moved with the brake shoe while in a first condition.

With this in mind, the splash shield assembly 80 of the present invention is specifically configured to take up/absorb these reaction forces and prevent undesirable stress on the wheel cylinder 180 during thermal contraction of the brake drum 74. To this end, and referring to FIG. 7A, the position of the lever tip 150 and relative orientations between the first ends 114 of the pivot levers 110 and the base 92 of the brake shoe 90a are shown when the parking brake is applied but before any brake drum 74 contraction occurs. A first reference point for the first ends 114 and lever tip 150 is indicated at ①. The pivot levers 110 on the brake shoe 90b have a similar reference point.

As noted, as the brake drum 74 cools, the reaction forces RF applied by the contracting inner surface 76 to the brake shoe 90a increase. Since the brake shoe 90a is secured to the pivot levers 110, and the first ends 114 of the pivot levers are prevented from moving towards the locked/unactuated wheel cylinder 180 (due to both the locked pistons 182 and the surface 99 abutting the first portion 152 of the lever tip 150), the reaction forces RF apply a bending moment to the pivot levers between the ends 114, 116 thereof.

When the reaction forces reach or exceed a predetermined amount, the first ends 114 of the pivot levers 110 deflect relative to the brake shoe 90a and relative to the pinned second ends 116 to reach a second condition. In particular, the lever tip 150—being non-rotatably connected to the first ends 114—pivots in the manner $P_1$ (counterclockwise as shown) such that the second portion 154 slides upwards along and relative to the stationary/fixed piston 182.

Figure 7B:
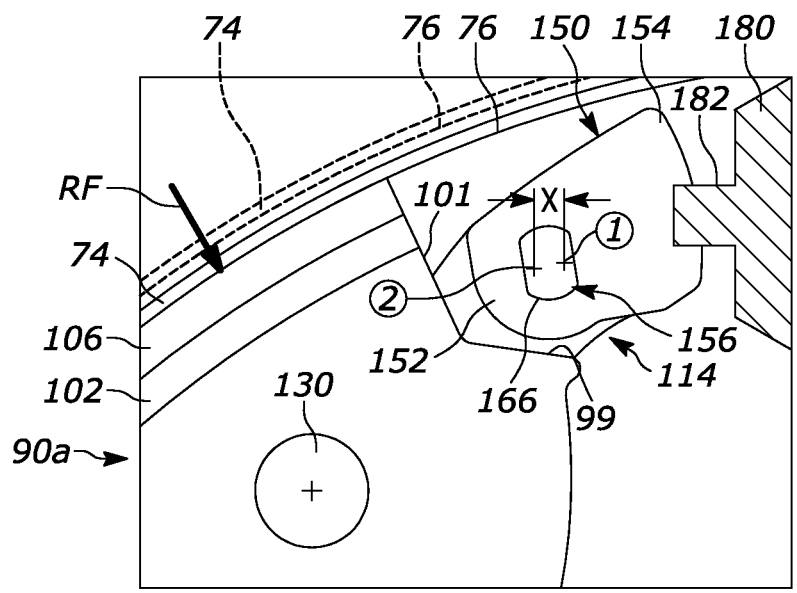
FIG. 7B is a schematic illustration of ends of the pivot levers deflected relative to the brake shoe to a second condition.

At the same time, the portions of the first ends 114 between the axle 130 and the lever tip 150 pivots about the axle in the manner $P_2$ (clockwise as shown). As a result, and as illustrated in FIG. 7B, the rounded portion 152 of the lever tip 150 moves out of engagement with the surface 99 of the web portion 94, i.e., the lever portion is "lifted off" the surface 99. A second reference point for the first ends 114 and lever tip 150 following deflection of the first ends 114 is indicated at ②. The original (pre-contracted) inner surface 76 is indicated generally in phantom for reference.

The lift off and bending of the first ends 114 allows the first ends to travel a distance indicated at X—defined generally by the lateral distance between the two reference points ①②. This travel distance X reflects the pivot levers 110 behaving as spring beams under deflection. It will be appreciated that the maximum travel distance X of the first ends 114 can be limited by configuring the pivot levers 110 and/or base 92 such that the first ends bottom out or cease movement by abutting either the surface 101 or the rim portion 102 of the base. In any case, deflection of the first ends 114 allows the entire brake shoe 90a to move inwardly towards the opening 83 in the adapter 81 to accommodate the contracting brake drum 74. That said, the additional reaction forces RF are absorbed by the deflecting pivot levers 110 thereby reducing the force transferred to the pistons 182.

It will be appreciated that the stiffness and shape of the pivot levers 110 can be configured such that the first ends 114 of the pivot levers 110 do not lift off the end surface 99 until a predetermined force is applied to the lever tip 150. The bending force can be applied by the pistons 182 urging the brake shoes 90a, 90b outward and/or by the reaction force RF created by the brake shoes engaging the brake drum 74.

In one example, a force of between about 0 kN and about 9 kN causes pivoting of the brake shoe 90a with the pivot levers 110 and application of the parking brake but does not cause the first ends 114 to deflect or the lever tip 150 to lift off the surface 99, i.e., the pivot levers 110 remain in the first condition. If, however, the bending force exceeds about 9 kN, the first ends 114 deflect relative to the brake shoe 90a and the lever tip 150 lifts off the surface 99. i.e., the pivot levers 110 deflect to the second condition.

It will be appreciated that the brake shoes 90a, 90b and pivot levers 110 can be configured to specifically tailor the degree first end 114 deflection that occurs, the timing of said deflection, etc. This can include, for example: selecting the location of the retaining pin 126 to adjust the level of pre-stress on the pivot levers 110, adjusting the length, geometry, material selection, and/or stiffness of the pivot levers, and/or adjusting the geometry of the notch defining the surfaces 99, 101.

When the parking brake is released, the control system 44 activates the wheel cylinder 180 to retract the pistons 182. This allows the deflected pivot levers 110 to automatically relax back to the first condition, thereby returning the lever tip 150 into abutment with the surface 99 of the brake shoe 90a. Returning of the brake shoes 90a, 90b to their initial positions spaced from the brake drum 74 is facilitated by the tension springs 170.

The present invention is advantageous in that it allows the brake shoes to have a lower stiffness with a high set pre-load capable of absorbing loads caused by the contracting brake drum. That said, the pivot arms—acting as deflectable spring beams—act as springs that take up the brake drum contraction forces instead of those same forces being borne by the wheel cylinders. This advantageously helps to improve the durability and lifespan of the wheel cylinders.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An apparatus for a drum brake assembly having a brake drum, comprising:
    a brake shoe;
    a pivot lever connected to the brake shoe and having a first condition movable with the brake shoe to apply braking force to the brake drum and a second condition deflected relative to the brake shoe for absorbing brake drum contraction forces, wherein a first end of the pivot lever deflects relative to a second end to reach the second condition and the second end is pre-loaded against a fastener connected to the brake shoe;
    a wheel cylinder coupled to the first end of the pivot lever for moving the first end of the pivot lever to apply the braking force; and
    a lever tip non-rotatably connected to the first end of the pivot lever and engaged by the wheel cylinder for moving the first end of the pivot lever to apply the braking force, the lever tip engaging the brake shoe when the pivot lever is in the first condition and being spaced from the brake shoe when the pivot lever is in the second condition.

2. The apparatus recited in claim 1, wherein the pivot lever includes a first opening for receiving an axle to pivotably connect the pivot lever to the brake shoe.

3. The apparatus recited in claim 2, wherein the first end of the pivot lever deflects about the axle relative to the brake shoe to reach the second condition.

4. The apparatus recited in claim 1, wherein the wheel cylinder is secured directly to the first end of the pivot lever.

5. The apparatus recited in claim 1, wherein the pivot lever is in the first condition until a predetermined force is applied to the first end of the pivot lever and deflects to the second condition when the predetermined force is reached or exceeded.

6. An apparatus for a drum brake assembly having a brake drum, comprising:
    a brake shoe having first and second sides;
    a first pivot lever positioned on and connected to the first side of the brake shoe;
    a second pivot lever positioned on and connected to the second side of the brake shoe, each of the first and second pivot levers extending from first ends to second ends pre-stressed against a fastener connected to the brake shoe, wherein the first and second pivot levers have a first condition movable with the brake shoe to apply braking force to the brake drum and a second condition movable with one another and deflected relative to the brake shoe for absorbing the brake drum contraction forces;
    a wheel cylinder coupled to the first ends of the first end second pivot levers for moving the first ends to apply the braking force; and
    a lever tip non-rotatably connected to the first ends of the first and second pivot levers and engaged by the wheel cylinder for moving the first ends of the first and second pivot levers to apply the braking force, the lever tip engaging the brake shoe when the first and second pivot levers are in the first condition and being spaced from the brake shoe when the first and second pivot levers are in the second condition.

7. The apparatus recited in claim 6, wherein the wheel cylinder is secured directly to the first ends of the first and second pivot levers.

\* \* \* \* \*